(12) United States Patent
Schmidt et al.

(10) Patent No.: US 8,929,937 B2
(45) Date of Patent: *Jan. 6, 2015

(54) MANAGING SPECTRUM RESOURCES USING CHANNEL MAPS AND PREDICTED NOISE FLOOR

(75) Inventors: Jeffrey C. Schmidt, Orlando, FL (US); Sekhar V. Uppalapati, Longwood, FL (US); Manish Shukla, Altamonte Springs, FL (US)

(73) Assignee: Spectrum Bridge, Inc., Lake Mary, FL (US)

( * ) Notice: Subject to any disclaimer, the term of this patent is extended or adjusted under 35 U.S.C. 154(b) by 529 days.

This patent is subject to a terminal disclaimer.

(21) Appl. No.: 13/291,806

(22) Filed: Nov. 8, 2011

(65) Prior Publication Data

US 2013/0115984 A1    May 9, 2013

(51) Int. Cl.
*H04W 16/14* (2009.01)
*H04W 72/00* (2009.01)
*H04B 17/00* (2006.01)

(52) U.S. Cl.
CPC .............. *H04W 16/14* (2013.01); *H04W 72/00* (2013.01); *H04B 17/0077* (2013.01)
USPC ............ 455/513; 455/446; 455/454; 455/423

(58) Field of Classification Search
CPC ..... H04W 72/00; H04W 72/04; H04W 72/12; H04W 72/121; H04W 72/1215; H04W 72/044; H04W 72/0453; H04W 74/00; H04W 74/08; H04W 74/0808; H04W 74/0816; H04W 74/0833; H04W 48/16; H04W 28/00; H04W 16/14; H04W 16/16; H04B 15/00
See application file for complete search history.

(56) References Cited

U.S. PATENT DOCUMENTS

| | | |
|---|---|---|
| 2008/0221951 A1 | 9/2008 | Stanforth et al. |
| 2008/0222019 A1 | 9/2008 | Stanforth et al. |
| 2008/0222021 A1 | 9/2008 | Stanforth et al. |
| 2009/0046625 A1 | 2/2009 | Diener et al. |
| 2009/0197627 A1 | 8/2009 | Kuffner et al. |
| 2010/0309317 A1 | 12/2010 | Wu et al. |
| 2011/0013089 A1 | 1/2011 | Adolphson et al. |
| 2011/0021153 A1 | 1/2011 | Safavi |
| 2011/0217944 A1 | 9/2011 | Tang |
| 2011/0287802 A1* | 11/2011 | Ma et al. .................. 455/517 |
| 2012/0106364 A1* | 5/2012 | Kasslin et al. ............ 370/252 |
| 2012/0165059 A1 | 6/2012 | Schmidt et al. |

OTHER PUBLICATIONS

International Search Report and Written Opinion from corresponding International Application No. PCT/US12/62556, mailed on Jan. 18, 2013.
"Digital Dividend: Cognitive Access, Consultation on License-Exempting Cognitive Devices using Interleaved Spectrum", Ofcom, Publication Date: Feb. 16, 2009.

(Continued)

*Primary Examiner* — Philip Sobutka
(74) *Attorney, Agent, or Firm* — Tucker Ellis, LLP

(57) ABSTRACT

A central registration system provides channel maps of available spectrum channels to radio devices. The channel map indicates relative noise floor amounts among the available channels. For this purpose, an amount of predicted interference caused by high-power protected transmitters on each channel available to the requesting radio device for wireless communications is determined, where interference from primary channel and out-of-band emissions of the transmitters is considered.

24 Claims, 3 Drawing Sheets

(56) References Cited

OTHER PUBLICATIONS

By the Commission, "Second Report and Order, Order on Reconsideration, and Second Further Notice of Proposed Rulemaking", Federal Communications Commission, 2004, FCC 04-167, WY Docket No. 00-230, pp. 1-180.
FCC 08-260, Second Report and Order and Memorandum Opinion and Order, Adopted Nov. 4, 2008 and Released Nov. 14, 2008.
Kwerel, Evan et al., "A Proposal for a Rapid Transition to Market Allocation of Spectrum", Federal Communications Commission, 2002, OPP Working Paper No. 38, pp. 1-50.
Radio Spectrum Management, Module 5 of ICT Regulation Toolkit, ITU, 2007.
Prabhu, Krish et al., "Time for Action" Genuine Ideas, 2002, [retrieved online Feb. 1, 2008], <http://www.genuineideas.com/ArticlesIndex/TimeForAction.htm>.
U.S. Spectrum Management Policy: Agenda for the Future, 1991.
47 C.F.R. 15.713.
Jones, Steven K. et al., "Initial Evaluation of the Performance of Prototype TV-Band White Space Devices", (2007), OET Report, FCC/OET 07-TR-1006.

* cited by examiner

MANAGING SPECTRUM RESOURCES USING CHANNEL MAPS AND PREDICTED NOISE FLOOR

TECHNICAL FIELD OF THE INVENTION

The technology of the present disclosure relates generally to wireless communications infrastructure and, more particularly, to a system and method for managing spectrum resources that are used to support wireless communications.

BACKGROUND

Wireless networks and systems are becoming increasingly popular. But wireless communications are constrained due to a lack of available, interference free spectrum that may be used for reliable communications within a geographic area.

To enhance the availability and reliability of interference free spectrum, procedures that are governed by regulatory agencies (e.g., the Federal Communications Commission (FCC) in the United States) have been developed for allocating and governing spectrum use. In the U.S., for example, the FCC licenses spectrum in a primary spectrum market to Commission licensees. A secondary market exists for the Commission licensees to sublease spectrum for use by other parties.

In the U.S., some spectrum may be used without a license in a spectrum sharing environment, but regulations on the spectrum may be imposed. For example, the FCC has eliminated analog television (TV) broadcasts in favor of digital TV broadcasts. This has freed spectrum channels for use by unlicensed radio systems to offer various services, such as mobile communications and Internet access. The freed spectrum is commonly referred to as TV white space. In the case of TV white space, the white space is comprised of unused TV spectrum between channel 2 and channel 51 (corresponding to 54 MHz to 698 MHz).

To avoid interference with digital TV broadcasts and other incumbent systems, such as wireless microphone systems, radios that use the TV white space are required to register and receive a channel map of available channels that may be used for the communications activity of the radio system. Current regulations require these radio systems to register every twenty-four hours. Also, for portable or mobile radios, if the radio moves into a new location, a new registration is required. Other regulations on the radios are present, such as transmitted power limits for different types of radios.

DETAILED DESCRIPTION OF EMBODIMENTS

Figure 1:
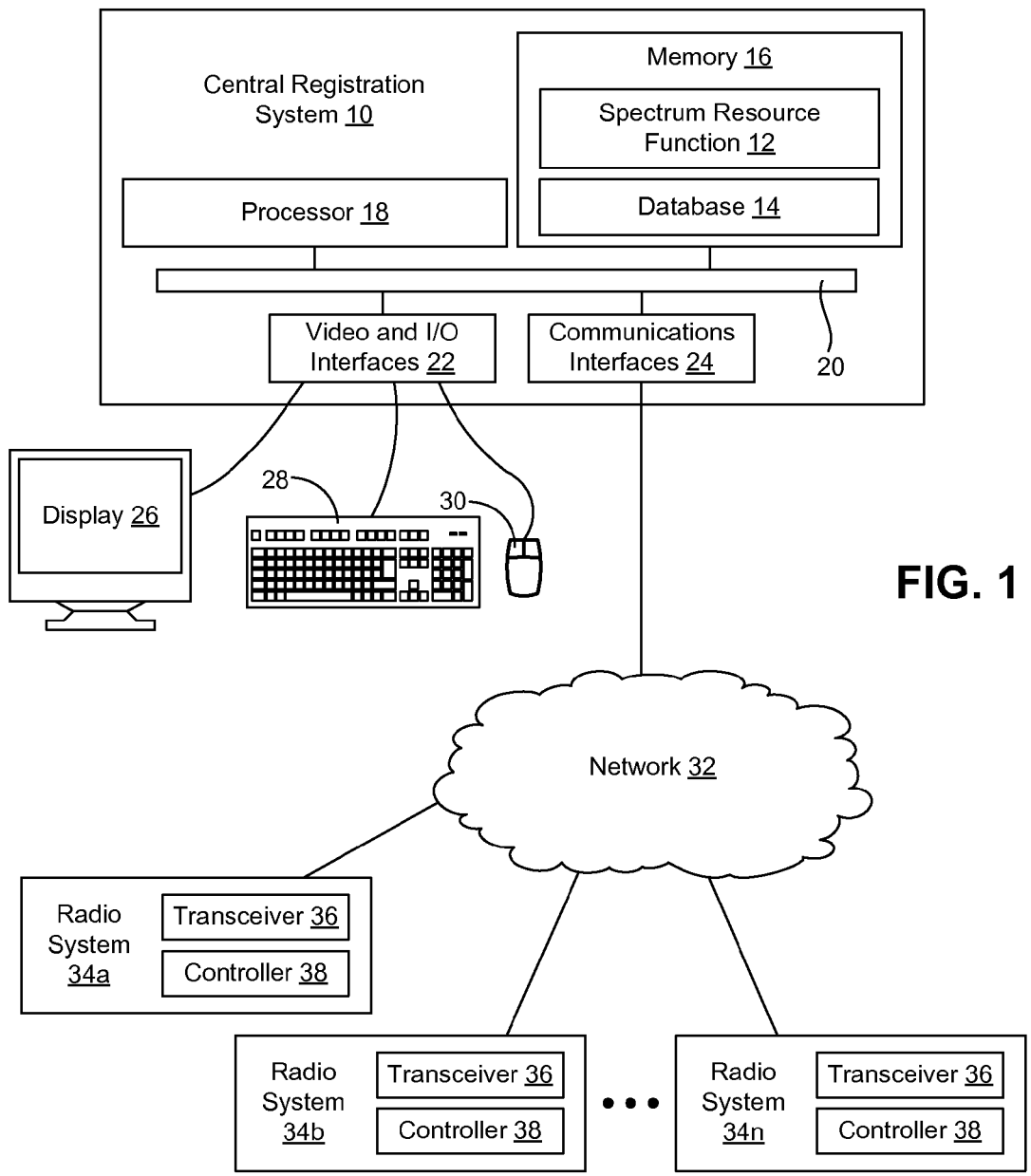
FIG. 1 is a schematic view of an exemplary system in which radio devices register for spectrum resources with a central registration system.

Embodiments will now be described with reference to the drawings, wherein like reference numerals are used to refer to like elements throughout. It will be understood that the figures are not necessarily to scale. Features that are described and/or illustrated with respect to one embodiment may be used in the same way or in a similar way in one or more other embodiments and/or in combination with or instead of the features of the other embodiments.

A. Introduction

Although various regulatory agencies have identified parameters for the use of unlicensed and/or shared spectrum, such as TV white spaces, there is room for improvement in the manner in which radio devices are informed of available spectrum. To improve use of spectrum resources, a central registration system provides channel maps (also referred to as channel lists) of available spectrum to radio devices based on predicted noise floor. The noise floor for each available channel is indicative of the quality of the channel for use by the radio device for which the channel map was generated. For instance, a channel may be unoccupied by a protected device and, therefore, available for use. But not all available channels have equal amounts of noise. Channels with a relatively high amount of noise, referred to as "grey spaces," may not adequately support the wireless communications operations of some radio devices.

In the present document, embodiments are described primarily in the context of radio devices that register for and use spectrum white spaces for wireless communications. The radio devices may be fixed in location, such as a wireless access point, or may be portable, such as a mobile WiFi hotspot device, a mobile telephone, a media player, a gaming device, a computer, a personal digital assistant (PDA), an electronic book reader, etc. It will be understood that each described radio device may be a radio system that includes one, or more than one, electronic device that is capable of wireless communications. In the case of a radio system that includes plural devices capable of wireless communications, a supervising device may register the entire radio system and select an operational channel, and each device in the system will be controlled to operate in accordance with the selected channel.

The white spaces may be television white spaces, in which case, the radio devices may be TV white space band devices (TVBDs). It will be appreciated, however, that the techniques described in this document may apply to any type of spectrum where usable spectrum is interleaved with spectrum used by incumbent, licensed or existing users, even if that spectrum is not referred to as white space by a governing regulatory entity. Also, the available spectrum (e.g., channels) may not be contiguous in frequency. Therefore, even though aspects of the disclosure are described in the context of the use and allocation of TV white spaces, there is utility and application of the described techniques in any context where spectrum is allocated in an effort to provide quality of service and/or mitigate the effects of interference.

Aspects of the disclosed systems and methods are independent of the type or types of radio devices that may use spectrum. As such, the systems and methods may be applied in any operational context for wireless communications, and wireless communications are expressly intended to encompass unidirectional signal transmissions (e.g., broadcasting of a signal for receipt by a device without response) and to encompass bidirectional communications where devices engage in the exchange of signals. The methods and systems may be applied to dumb and/or cognitive radio devices. The methods and systems may be applied to licensed or unlicensed spectrum. Furthermore, the methods and systems are generic to modulation schemes, harmonic considerations, frequency bands or channels used by the radio devices, the type of data or information that is transmitted, how the radio devices use received information, and other similar communications considerations. Thus, the systems and methods have application in any suitable environment.

B. System Architecture

With reference to FIG. 1, illustrated is a schematic block diagram of a computer-implemented central registration system 10. The central registration system 10 is capable of executing computer applications (e.g., software programs) and may be configured to execute a spectrum resource function 12 and to store a database 14 that contains data regarding spectrum information that is used by the spectrum resource function 12.

In one embodiment, the spectrum resource function 12 is embodied as one or more computer programs (e.g., one or more software applications including compilations of executable code). The computer program(s) and/or database 14 may be stored on a non-transitory computer readable medium, such as a magnetic, optical or electronic memory 16 (e.g., hard disk, optical disk, flash memory, etc.). In the following description, ordered logical flows for the functionality of the spectrum resource function 12 are described. But it will be appreciated that the logical progression may be implemented in an object-oriented manner or in a state-driven manner.

To execute the spectrum resource function 12, the central registration system 10 may include one or more processors 18 used to execute instructions that carry out specified logic routines. The memory 16 may store data, logic routine instructions, computer programs, files, operating system instructions, and the like. As illustrated, the spectrum resource function 12 and the database 14 may be stored by the memory 16. The memory 16 may comprise several devices, including volatile and non-volatile memory components. Accordingly, the memory 16 may include, for example, random access memory (RAM) for acting as system memory, read-only memory (ROM), hard disks, floppy disks, optical disks (e.g., CDs and DVDs), tapes, flash devices and/or other memory components, plus associated drives, players and/or readers for the memory devices. The processor 18 and the components of the memory 16 may be coupled using a local interface 20. The local interface 20 may be, for example, a data bus with accompanying control bus, a network, or other subsystem.

The system 10 may have various video and input/output (I/O) interfaces 22 as well as one or more communications interfaces 24. The interfaces 22 may be used to operatively couple the system 10 to various peripherals, such as a display 26, a keyboard 28 a mouse 30, and other input and/or output devices (a microphone, a printer, a speaker, etc.). The communications interfaces 24 may include, for example, a modem and/or a network interface card. The communications interfaces 24 may enable the system 10 to send and receive data signals, voice signals, video signals, and the like to and from other computing devices via an external network 32. The external network 32 may include the Internet, a wide area network (WAN), a local area network (LAN), direct data link, or similar systems, and may allow information to be exchanged between the system 10 and radio devices 34.

Each radio device 34 (labeled 34a through 34n in FIG. 1) may include at least one transceiver 36 for engaging in wireless communications and a controller 38 for managing radio device operation, including carrying out the functions of the radio device 34 that are described in this disclosure. The controller 38 may include a processor and a non-transitory computer readable medium (e.g., a memory), where the processor executes logical instructions (e.g., software) that are stored by the memory and embody the described functionality. In other embodiments, the controller is implemented with a firmware-based microcontroller or in dedicated circuitry (e.g., an application-specific integrated circuit or ASIC). Therefore, the radio device 34 may be considered to carry out client functionality, including interacting with the central registration system 10 and controlling spectrum use of the radio device 34 and any subservient radios.

In one embodiment, the system 10 may be configured as a server that executes the function 12 to host the below-described spectrum management functions. The spectrum management functions include registering qualified radio devices 34 so that the radio devices 34 may make use of spectrum for wireless communications. As part of the registration process, the system 10 generates a channel list containing meaningful channel information for use by the radio devices 34 to assist the radio devices 34 in selecting a channel for wireless communications in a manner that increases the operational capacity of the radio devices 34 by avoiding channels with potentially high levels of interference. Also, while the registration process for the radio devices 34 may be fully automated, the function 12 may host an Internet-style website for the various corresponding parties to conduct initial enrollment with the system 10, conduct manual registration if needed, access various tools and reports supplied by the function 12, and so forth.

The central registration system 10 collects spectrum usage information from various sources. The sources may include the radio devices 34, which are configured to provide feedback to the central registration system 10 in the form of radio capability and configuration information, channel selection, and/or the results of spectrum sensing. The sources also may include database information that contains information about known spectrum users, such as incumbent spectrum uses (e.g., digital television stations, wireless microphone systems, cable head end systems, etc.), licensed spectrum users, or radio systems that are exempt from seeking channel map information from the central registration system 10. This data may be stored in the database 14 or obtained from remote data sources.

C. Spectrum Management

C(i). Management Techniques

Available, interference-free spectrum for supporting wireless communications is a scarce resource and the demand for wireless communications is increasing. The following techniques assist in using spectrum efficiently by facilitating dissimilar radio technologies to co-exist.

Figure 2:
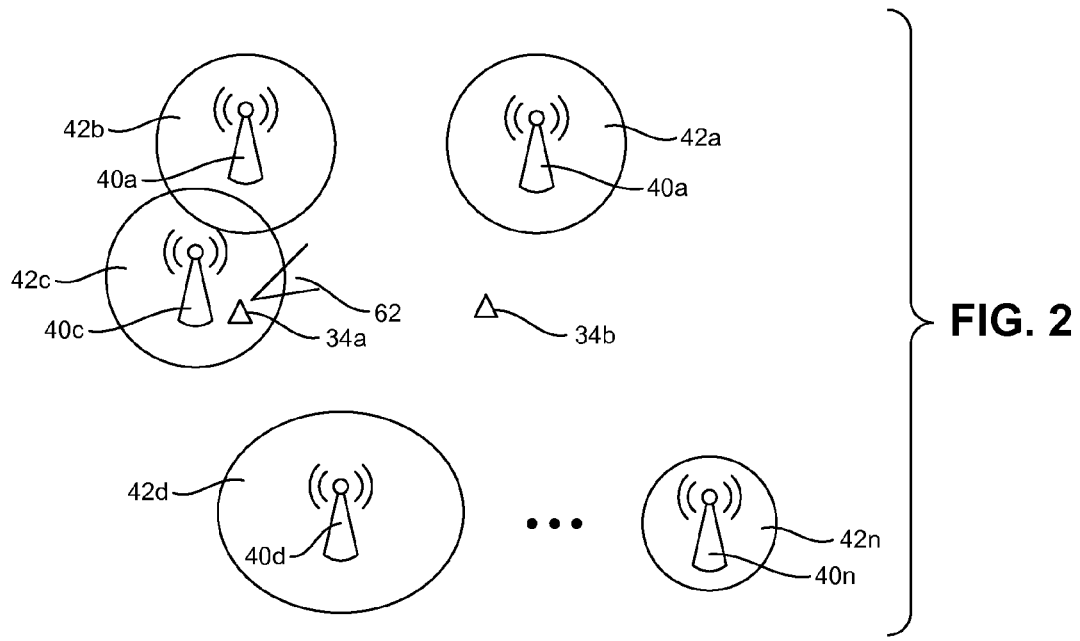
FIG. 2 is a representative operational environment for a radio device that registers for spectrum use.

With additional reference to FIG. 2, the techniques will be described in an exemplary environment where low-powered unlicensed devices (e.g., the illustrated radio devices 34a and 34b) and high-powered protected devices (e.g., television transmitters) share a common set of bands. As a more specific example, the low-power devices may be broadband data transceivers (e.g., TVBDs) that operate at about +30 dbm in white spaces that are interleaved with channels used by television transmitters that operate at about +90 dbm. The high-powered devices 40 operate in respective protected areas 42. In the illustrated example, the high-powered devices 40a through 40n each have a corresponding protected area 42a through 42n. The protected areas 42 are established to reduce interference to the operation of the respective devices 40 by limiting the use of the channel on which the device 40 operates (referred to as the primary channel of the device 40) by other devices in the protected area 42.

The availability of certain frequencies, or white space channels, is a function of time, channel use, and geographic area. This concept of a shared spectrum ecosystem presents little risk to the operational capability of the high-power devices as the low-power devices tend to not cause interference to reception of the high-power signals and do not engage in co-channel operations with protected areas. But the presence of high-powered transmitters can be very disruptive to operation of the low-power devices. By comparison, the high-power transmitters often broadcast at about one megawatt (MW) and with high-elevation antennas, whereas the low-power devices typically rely on transmitters of about one watt or less and are deployed with lower elevation antennas.

Therefore, the high-power transmitters operating in VHF and UHF frequencies have a vast reach that affects the noise floor over very large areas (e.g., hundreds of miles) for the low-power devices. The primary channel and out-of-band coverage of high-power transmitters (e.g. TV stations) can be accurately predicted using empirically-derived pass loss models, such as R6602 and Longley Rice. From this information, the noise floor for each available channel in the low-power device's geographic location may be determined so that a channel with a relatively low noise floor may be selected for use. The effect of the noise from the high-powered devices may be further refined using information about the low-power device, such as antenna gain, pattern and azimuth, and noise sensing data. The central registration manager 10 may be considered a co-existence manager due to its role in determining noise floor information and providing the information to the deployed radio devices 34. The information may be updated as conditions change due to movement of devices or variations in channel use.

Figure 3:
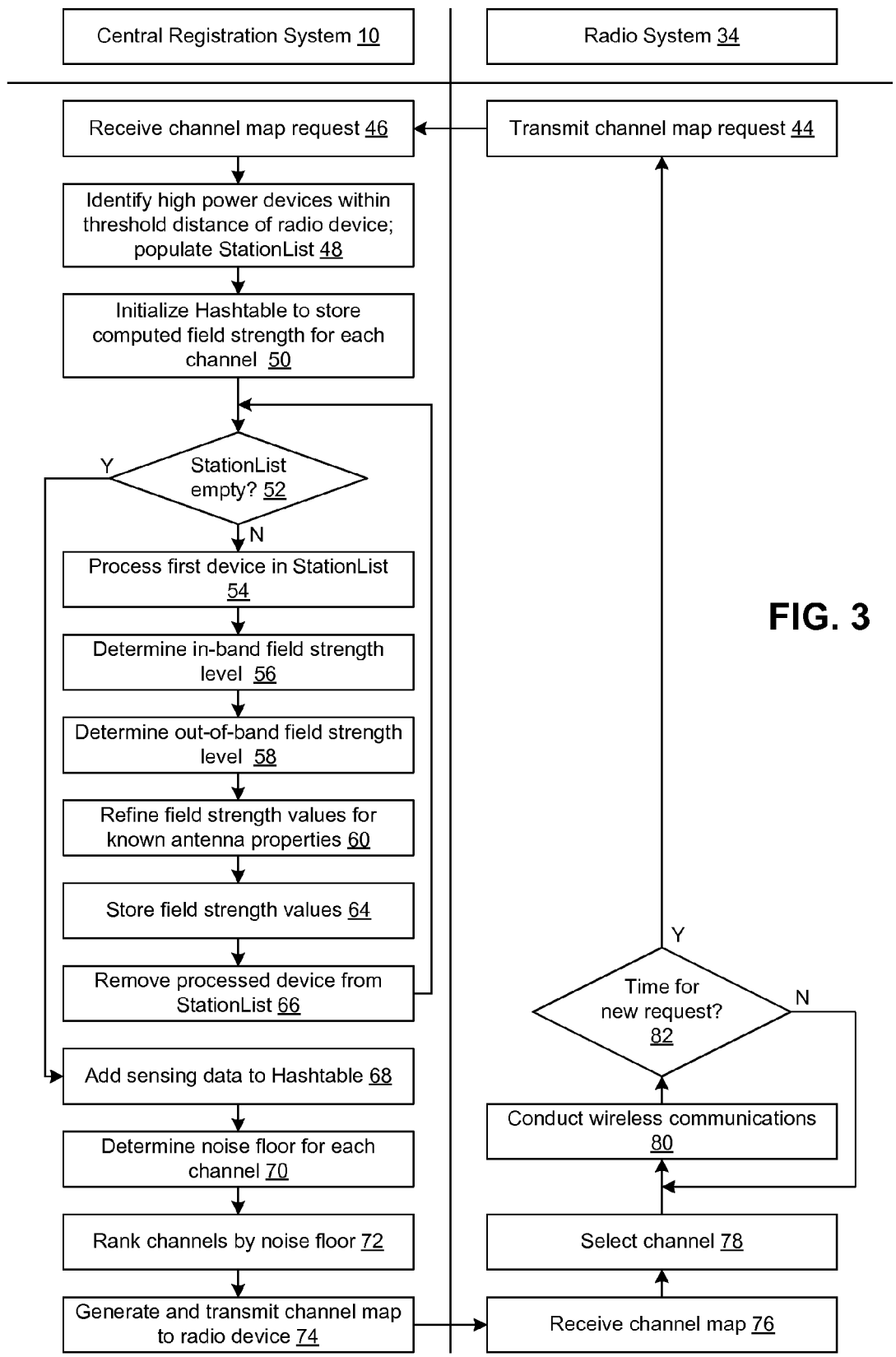
FIG. 3 is a flow diagram representing an exemplary method of managing spectrum resources.

With additional reference to FIG. 3, illustrated are logical operations to implement exemplary methods of managing spectrum. The exemplary method may be carried out by executing an embodiment of the spectrum resource function 12, for example. Thus, the flow diagram may be thought of as depicting steps of a method carried out by the system 10. Although the flow chart shows a specific order of executing functional logic blocks, the order of executing the blocks may be changed relative to the order shown. Also, two or more blocks shown in succession may be executed concurrently or with partial concurrence. Furthermore, the registration process for one radio device 34 is described. The described functions may be repeated for plural radio devices 34.

In block 44, the requesting radio device 34 transmits a channel map request to the central registration system 10 to request receipt of a channel map containing the identities of channels that the radio device 34 may use for wireless communications. The channel map request is received by the central registration system 10 in block 46. The channel map request may include information to identify the radio device 34, capabilities, configuration, and/or preferences of radio device 34, and a location of the radio device 34. Some of the information may have been previously provided to the central registration system 10 during an initial enrollment of the radio device 34 so that the information need not be repeated in each channel map request.

The identity information may include, for example, a regulatory agency identifier (e.g., in the U.S. an FCC ID), a device serial number, contact information of a responsible person or entity (e.g., contact name, street and/or mailing address, electronic mail address, telephone number, etc.), radio type, and any other appropriate information.

The capabilities, configuration, and/or preferences information may include, for example, channels over which the radio device 34 is configured to operate, an intended wireless application of the radio device 34, whether the radio device 34 will operate indoors or outdoors, protocols supported by the radio device 34, antenna height, antenna gain, antenna configuration, direction or azimuth information, transmit and/or receive power capabilities, spectral mask, tolerances for noise floor, and any other performance-related characteristics of the radio device 34.

Location information may be determined in any appropriate manner. Many radio devices are capable of determining their own location. For example, almost all mobile telephones and public safety radios sold since 2009 are equipped with global positioning system (GPS) location determining technology or other mechanisms for determining their location within approximately ten to fifty meters. As another example, radios that employ spectrum sharing, such as under FCC Order No. 04-186 concerning television white spaces, are required to be "location aware." Another location determination technique is to use a postal address, such as a street address or a postal code (e.g., in the United States a "zip+4" code may provide a sufficiently accurate location estimation). Another location determining technique may involve reverse triangulation using a channel map provided by the radio device 34. For instance, the radio device 34 may identity the channels on which the radio device 34 detects (or "sees") transmission activity and corresponding signal strengths. From matching this information to known service contours of radio devices, the central registration system 10 may estimate the location of the radio device 34.

In addition to the channel map request, the radio device 34 may transmit feedback of spectrum use conditions in the location of the radio device 34. For instance, the radio device 34 may identify the channels on which the radio device 34 detects (or "sees") transmission activity and corresponding signal strengths. This data represents data of actual broadcasts by other radio systems and may be used to adjust noise floor calculations. Other exemplary feedback may include channel metrics, such as sensed noise on one or more channels and/or packet completion rate on one or more channels. Prior to receiving a channel map and selecting a channel for operation, the radio device 34 may not be able to provide certain feedback information, such as packet completion rate. But in other circumstances, such as when a radio device 34 sends a channel map request because a current channel map grant is about to expire or because the radio device 34 is moving into a different location, then more feedback information may be available.

In block 48, the central registration system 10 may commence processing of the channel map request. In block 48, the central registration system 10 identifies each high-power device 40 that is within a predetermined threshold distance from the radio device 34. The threshold distance is established to identify transmitters that have a reasonable chance of contributing to the noise floor at the location of the radio device 34. For instance, when calculating noise floor for channels in Orlando Fla., one may want to consider transmitters as far away as Miami Fla. (approximately 200 miles from Orlando) and Atlanta Ga. (approximately 420 miles from Orlando). But there would be little need to consider transmitters in Cleveland Ohio (approximately 1,000 miles from Orlando). In one embodiment, the threshold distance is in the range of about 100 miles to about 800 miles. In another embodiment, the threshold distance is in the range of about 250 miles to about 500 miles. In still another embodiment, the threshold distance is about 300 miles.

Once the high-power devices 40 are identified, the identified high-power devices 40 are added to a list of considered devices, referred to as a StationList. Then, in block 50, a Hashtable is indexed by channel identifier (e.g., channel number). The Hashtable is used to store computed field strength for each channel. In one embodiment, the Hashtable contains all channels in the range of channels managed by the central registration system and the following determinations are made for each of these channels. In another embodiment, the Hashtable contains the channels that are not protected in the location of the requesting radio device 34 (e.g., the channels that are potentially available for use by the requesting radio device 34) and the following determinations are made for each of these channels, but not the protected (hence, unavailable) channels.

A process loop is carried out to determine the field strength level for each channel based on the contributions from each device 40 in the StationList. In the illustrated embodiment, the process loop starts in block 52 where a determination is made as to whether the StationList is empty. If a negative determination is made in block 52, the logical flow proceeds to block 54. In block 54, processing is commenced for the first device 40 in the StationList.

At block 56, the processing includes determining in-band field strength of the device 40 being processed at the location of the requesting radio device 34. The band for which the in-band field strength is determined is the operating channel (referred to as n or the primary channel) of the device 40 being processed. The determination is made by computation using a path-loss model. The path-loss model may account for known information, such as one or more of the distance between the location of the device 40 and the location of the device 34, terrain data, and antenna characteristics including but not limited to antenna height. Exemplary path loss models include F-curves, R6602, Raleigh fading, and Longley Rice, although other path loss models may be used. The path loss model may be predetermined, such as by user settings or by default. In other embodiments, a path loss model may be selected for the device 40 being processed in accordance with one or more considerations, such as the type of terrain between the device 40 and the device 34, distance between the device 40 and the device 34, characteristics of the device 40 (e.g., transmitter type, antenna azimuth and/or height, transmit power, etc.), operating channel of the device 40, setting (e.g., urban or rural) of the device 40 or the device 34, or other consideration.

At block 58, the processing includes determining out-of-band field strength of the device 40 being processed at the location of the requesting radio device 34. The determination is repeated for a predetermined number of adjacent channels above the operating channel of the device 40 being processed and a predetermined number of adjacent channels below the operation channel of the device 40. If the predetermined number of channels is two, for example, then the out-of-band field strength of the device 40 is determined for n−1, n+1, n−2, and n+2. The predetermined number of channels may be one, two, three, four, or some other number of channels. The out-of-band field strength for each channel may be calculated using the in-band field strength and reducing the in-band field strength by an amount determined in accordance with empirical data and/or regulatory requirements.

In most circumstances, an emission mask for the device 40 may be assumed and the emission mask drives the calculation of the out-of-band field strength for each channel. In one embodiment, the same calculation approach is used for each device 40. But some devices 40 filter out-of-band emissions better than other devices 40. If an emission mask or profile is known for the device 40 being processed, the characteristics of that device may be used in the calculation of out-of-band field strength values.

Refinements to the values calculated in blocks 56 and/or 58 for any known antenna properties for the device 34 may be made at block 60. Exemplary antenna properties considered include antenna gain, azimuth, and polarization. In the representative illustration of FIG. 2, device 34a has an azimuth (represented by cone 62) that points in the direction of device 40a. Therefore, in the illustrated example and under the assumption that device 40d does not transmit with much greater power than device 40a, device 40a may have a greater contribution to the noise floor for device 34a than device 40d even though device 40d is geographically closer and has a larger protected area 42d.

In block 64, the calculated field strength values for in-band emissions and out-of-band emissions are stored in the corresponding channel indices of the Hashtable. Next, in block 66, the device 40 that was processed in the preceding blocks of the processing loop is removed from the StationList. The logical flow then returns to block 52 to determine if all devices 40 in the StationList have been processed. If so, a positive determination is made in block 52 and the logic flow proceeds to block 68.

In block 68, if any signal strength sensing data is available from the device 34a or other nearby devices 34, then this sensing data may be added to the Hashtable under the appropriate channel indices. In one embodiment, the sensing data includes detected signals from contributors other than those considered in the prior blocks so as to avoid unintended inflation of the amount of noise on any of the channels.

In block 70, the noise floor for each channel is determined. In one embodiment, the noise floor for each channel is calculated from the field strength values for the corresponding channel index in the Hashtable. The calculation includes converting each field strength value for the channel to power density and summing the resulting power density values. Field strength (also referred to as signal strength) is often expressed in dBuV/m, which is a unit favored by broadcasters since it is easy to measure and allows for easy calculation of the receiver voltage for a standard antenna. Field strength expressed in dBuV/m is converted to power density for free space and expressed in dBm/m$^2$ using the conversion relationship of equation 1.

$$dBm/m^2 = dBuV/m - 115.8 \quad\quad\quad \text{Eq. 1}$$

The conversion relationship of equation 1 is derived from the power density and field strength equation $P_D = E^2/Z_0$, where $P_D$ is power density in W/m$^2$, E is the root-mean-square (RMS) value of the field in volts/meter, and $Z_0$ is the free space characteristic impedance of 377Ω.

To sum values expressed in dBm (or dBm/m$^2$), the values are converted to mW (or mW/m$^2$) using the relationship of equation 2.

$$mW = 10^{(dBm/10)} \quad\quad\quad \text{Eq. 2}$$

Values expressed in mW may be added and, if desired, converted back to dBm (or dBm/m$^2$) using the relationship of equation 3.

$$dBm = 10 * \log_{10}(mW) \quad\quad\quad \text{Eq. 3}$$

In block 72, the channels are ranked based on the determined noise floor value. The channel with the lowest determined noise floor represents the best channel available for operation and, therefore, receives the highest ranking.

In block 74, a channel map for the requesting radio device 34 is generated and transmitted to the requesting radio device

34. The channel map contains each channel that is available for use by the requesting radio device 34 (e.g., the unprotected channels in the location of the requesting radio device 34). In one embodiment, the channels are ordered in accordance with the ranking of block 72. The radio device 34 is configured to recognize that the order of channels in the channel map indicates the relative predicted amount of noise for each channel. This information may be used as part of a subsequent channel selection operation of the requesting radio device 34. In another embodiment, the channel map includes, for each channel in the channel map, a value indicative of the amount of predicted noise. For example, the determined noise floor value for each channel may be transmitted as part of the channel map. The requesting radio device 34 may use these values as part of a subsequent channel selection operation of the requesting radio device 34.

In block 76, the radio device 34 receives the channel map. Then, in block 78, the radio device 34 selects one of the available channels from the channel map for use. In block 80, the radio device 34 carries out wireless communications using the selected channel. Next, in block 82, the radio device 34 determines if it is time to submit a new request for a channel map to the system 12 by returning to block 44. If it is not time to submit a new request, the wireless communications continue. A positive determination may be made in block 82 by determining that registration is required under regulatory agency requirements, such as by the elapsing of a predetermined amount of time since the last registration (e.g., 24 hours) or by movement of the radio device 44 to a new location. The radio device 34 also may request a new channel map at other times and/or for other reasons. For instance, the radio device 34 may request a new channel map (or select a different channel from the current channel map) if the radio device 34 is unsatisfied with a quality of service (QoS) of the selected channel.

C(ii). First Prophetic Example

This example describes the noise contributions from a protected radio device 40 in what is typically the worst case scenario. For in-band noise, this scenario is when the requesting radio device 34 is just outside the protected entity service contour of the radio device 40 where the noise contributions from the radio device 40 are likely to be the highest.

Table 1 shows the contour field strength values at the protected contour for television stations as established by the FCC.

TABLE 1

| Type of TV Station | Channel | Protected Contour | |
|---|---|---|---|
| | | Contour (dBu) | Propagation Curve |
| Analog: Class A TV, LPTV, translator and booster | Low VHF (2-6) | 47 | F(50, 50) |
| | High VHF (7-13) | 56 | F(50, 50) |
| | UHF (14-69) | 64 | F(50, 50) |
| Digital: Full service TV, Class A TV, LPTV, translator and booster | Low VHF (2-6) | 28 | F(50, 90) |
| | High VHF (7-13) | 36 | F(50, 90) |
| | UHF (14-69) | 41 | F(50, 90) |

According to table 1, the highest amount of in-band noise from a digital television station that a radio device 34 may expect to experience is 41 dbuV/m, which is equal to −74.8 dbm/m$^2$. When adjusted by the effective area of a typical receive antenna with 7.5 dbi of gain (effective area 0.18 m$^2$) where 10*log (1 meter/0.18 meters) equals 7.4 db, this yields a received noise power of −82.2 dbm, which is a very noisy environment.

The out-of-band emissions generated by a high-power station are considered next. Using empirically-derived field data, it has been determined that the out-of-band noise generated by a TV station in adjacent 6 MHz channels can be as follows: about 45 db less than the in-band signal strength in immediately adjacent channels (n±1), about 50 db less than the in-band signal strength two channels above and below (n±2), about 55 db less than the in-band signal strength three channels above and below (n±3), and about 60 db four less than the in-band signal strength channels above and below (n±4).

For the worst case scenario, the out-of band emissions typically are caused by stations having a protected region in which the radio device 34 is located. The in-band signal strength of these stations at the location of the radio device 34 may be as high as 100 dbuV/m since the radio device 34 is within the protected entity service contour. Therefore, an available (un-protected) white space channel+/−2 channels from a protected channel can yield a noise floor as high as 50 dbuV/m (−65.8 dbm), yielding a received noise power of −73.8 dbm (for a 7.5 dbi antenna). This amount of noise effectively renders these channels inoperative for wireless communication by the radio device 34. These channels may be considered "grey space" rather than white space.

C(iii). Second Prophetic Example

Figure 4:
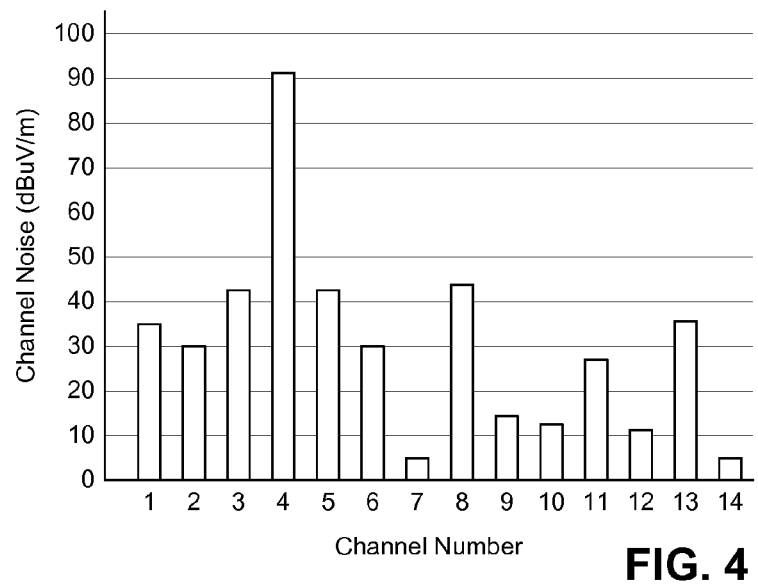
FIG. 4 is an exemplary graph of channel noise versus channel number as determined by the central registration system.

In this example, noise floor values for channels one through fourteen have been assumed. FIG. 4 is a graph of the noise floor values. Of these channels 1-2 and 6-14 are available as not being protected in the location of the radio device 34. Channels 7, 9, 10, 12 and 14 are the most desirable of these channels due to low instances of interference on these channels. Channel 4 is a protected channel in the location of the radio device 34 as being occupied by a protected device 40. Channels 3 and 5 are also protected as being adjacent protected channel 4. Channels 2 and 6 are available, but are undesirable for use by the radio device 34 due to out-of-band emissions caused by the device 40 operating on channel 4. Channels 1, 8, 11 and 13 are available, but are less desirable than channels 7, 9, 10, 12 and 14 due to predicted co-channel emissions caused by far away transmitters.

A resulting ranked channel map for this exemplary set of results may appear as follows in table 2.

TABLE 2

| Channel | Available | Noise (dBuV/m) |
|---|---|---|
| 7 | Yes | 5 |
| 14 | Yes | 5 |
| 12 | Yes | 12 |
| 10 | Yes | 13 |
| 9 | Yes | 14 |
| 11 | Yes | 27 |
| 2 | Yes | 30 |
| 6 | Yes | 30 |
| 1 | Yes | 35 |
| 13 | Yes | 36 |
| 8 | Yes | 43 |
| 3 | No | — |
| 4 | No | — |
| 5 | No | — |

C(iv). Third Prophetic Example

In this example, the requesting radio device 34 is located in a location where channels 1, 2, 5, and 6 are available. At this location, two televisions stations, referred to as TV1 and TV2, respectively operate on channels 3 and 4 and are within the threshold distance for consideration as noise contributors to the requesting radio device 34. Sensing data is available at this location for channel 6. At the time of the request, the sensed field strength value is 17.8 dBuV/m.

In accordance with the foregoing process flow, TV1 (primary channel 3) and TV2 (primary channel 4) are added to the StationList. For purposes of this example, it will be assumed that the determined in-band field signal strength level for TV1 is 95 dBuV/m. Each TV station emission uses a filter to restrict emissions in adjacent channels, but emissions are still present in adjacent channels. For purposes of the example, a mask is applied where out-of-band emissions are determined to be 45 db less than the in-band signal strength in immediately adjacent channels (n±1) and 50 db less than the in-band signal strength two channels above and below (n±2). Under these assumptions the out-of-band field strengths due to TV1 for channels 2 and 4 (n±1) are each 50 dBuV/m (95 dBuV/m minus 45 dBuV/m) and the out-of-band field strengths due to TV1 for channels 1 and 5 (n±2) are each 45 dBuV/m (95 dBuV/m minus 50 dBuV/m). The field strength values for TV1 are stored in the Hashtable under the appropriate channel indices.

Similar field strength determinations are made for TV2, which operates on channel 4. For purposes of this example, it will be assumed that the determined in-band field signal strength level for TV2 is 90 dBuV/m. Using the same out-of-band calculation assumptions that were used for TV1, the out-of-band field strengths due to TV2 for channels 3 and 5 (n±1) are each 45 dBuV/m (90 dBuV/m minus 45 dBuV/m) and the out-of-band field strengths due to TV2 for channels 2 and 6 (n±2) are each 40 dBuV/m (90 dBuV/m minus 50 dBuV/m). The field strength values for TV2 are stored in the Hashtable under the appropriate channel indices.

The sensing data for the location of the requesting radio device 34 (17.8 dBuV/m (6 MHz) in channel 6) is also stored in the Hashtable under the index for channel 6. Table 3 represents an exemplary Hashtable for the values described in this example.

TABLE 3

| Index | Contributor 1 (TV1) | Contributor 2 (TV2) | Sensing Data |
|---|---|---|---|
| Channel 1 | 45 | — | — |
| Channel 2 | 50 | 40 | — |
| Channel 3 | 95 | 45 | — |
| Channel 4 | 50 | 90 | — |
| Channel 5 | 45 | 45 | — |
| Channel 6 | — | 40 | 17.8 |

Table 4 shows the Hashtable of table 3 with the values converted to dBm/m² and the sum of the values for each index.

TABLE 4

| Index | Contributor 1 (TV1) | Contributor 2 (TV2) | Sensing Data | Sum |
|---|---|---|---|---|
| Channel 1 | −70.8 | — | — | −70.8 |
| Channel 2 | −65.8 | −75.8 | — | −65.3 |
| Channel 3 | −20.8 | −70.8 | — | −20.7 |
| Channel 4 | −65.8 | −25.8 | — | −25.7 |
| Channel 5 | −70.8 | −70.8 | — | −67.8 |
| Channel 6 | — | −75.8 | −98 | −75.7 |

C(v). Alternative Management Techniques

There are a total 50 channels in TV white space. There are about 8,000 broadcast television stations in the U.S. Processing and recording field strength values for each of the channels can become processor intensive when there are a relatively large number of noise contributors to consider. To reduce processing while minimizing sacrifices in performance, the contributors considered by the central registration system 10 may be limited to high-powered devices 40 that operate on channels that are available (un-protected) at the location of the requested radio device 34 and high-powered devices 40 that operate on channels adjacent to the channels that are available (un-protected) at the location of the requested radio device 34 by one channel increment (n±1) and by two channel increments (n±2) (or another predetermined number of channel increments from the available channel). Under this adjustment, the Hashtable need only contain computed field strength values and sensing data for available channels. For example, if only channel 4 and 6 are available at the requesting device's location, then only those high-power transmitters operating on the available channels 4 and 6 and the channels within the predetermined number of adjacent channels above and below the available channels are considered in the field strength level computations. Any other high-power transmitters may be ignored. If the predetermined number of adjacent channels above and below the available channels is two, then under the example where the available channels are channels 4 and 6 the channels adjacent channel 4 within two channel increments are channels 2, 3, 5, and 6. Similarly, the channels adjacent channel 6 are 4, 5, 7, and 8. As a result, the channels to be processed include the subset of channels 2, 3, 4, 5, 6, 7, and 8, and processing of transmitters not broadcasting on those channels may be ignored.

An additional or alternative change to reduce processing is to ignore transmitters that do not have a significant effect on the noise floor level of the transmitter's primary channel and adjacent channels. As an example, assume that there are 200 TV stations within a radius defined by the predetermined distance. Typically, not all of these stations will transmit at a high-power level given their distance from the location of the requesting radio device to have a significant effect on the primary channel of the transmitter and the adjacent channels. Such stations may be eliminated from consideration. In one embodiment, the transmitters that are ignored are those transmitters that have a computed field strength at their primary channel that is less than a predetermined threshold field strength threshold, regardless of the distance between the transmitter and the requesting radio device. In another embodiment, if transmit power at a predetermined distance from the location of the requesting radio device falls below a predetermined field strength threshold, then this station is eliminated from consideration.

D. Conclusion

Although certain embodiments have been shown and described, it is understood that equivalents and modifications falling within the scope of the appended claims will occur to others who are skilled in the art upon the reading and understanding of this specification.

What is claimed is:

1. A system for providing channel maps of available spectrum to radio devices, comprising:
   an interface to communicate with the radio devices over a network; and
   a processor that executes a spectrum resource function that is stored in a memory and, by execution of the spectrum resource function, the system configured to:
      receive a request for a channel map from one of the radio devices;
      determine channels that are available to the requesting radio device for wireless communications;
      determine, for each channel determined to be available, a predicted noise floor amount caused by high-power protected transmitters that are known to the system prior to receipt of the request, wherein the determination of predicted noise floor is made using a path loss model for a location of the requesting radio device, and wherein, for each predicted noise floor, interference from primary channel and out-of-band emissions of the transmitters is considered; and
      transmit a channel map of the available channels to the requesting radio device, the channel map indicating relative predicted noise floor amount among the available channels.

2. The system of claim 1, wherein the request is a whitespace channel map request.

3. The system of claim 1, wherein the available channels in the channel map are ranked in order of noise floor from least to most to indicate the relative noise floor amount among the available channels.

4. The system of claim 1, wherein the channel map includes the determined noise floor amount for each available channel.

5. The system of claim 1, wherein transmitters considered as contributors to the predicted noise floor amounts are transmitters that are within a predetermined distance from the requesting radio device.

6. The system of claim 1, wherein transmitters considered as contributors to the predicted noise floor amounts are transmitters that have a field strength at the transmitter's primary channel that is above a predetermined threshold.

7. The system of claim 1, wherein transmitters considered as contributors to the predicted noise floor amounts are transmitters that have either one of a primary channel matching one of an available channel for the requesting radio device or a channel adjacent an available channel for the requesting radio device by a predetermined number of channel increments above or below the available channel.

8. The system of claim 1, wherein the predicted interference is determined by:
   for each transmitter considered, identify an interference contribution for the transmitter on the transmitter's primary channel and out-of-band emissions for adjacent channels that are a predetermined number of channel increments above or below the primary channel; and
   for each available channel, sum the corresponding interference contributions from each transmitter.

9. The system of claim 8, for each channel for which sensed interference data is available, the system further includes the sensed interference data in the sum of the interference contributions from each transmitter.

10. The system of claim 8, wherein the predicted noise floor amount for each available channel is adjusted for antenna characteristics of the requesting radio device.

11. The system of claim 8, wherein the interference contribution for the transmitter's primary channel is determined using a path loss model and the distance between the transmitter and the requesting radio device.

12. The system of claim 11, wherein the interference contribution for the channels adjacent the transmitter's primary channel is determined by reducing the interference contribution for the transmitter's primary channel by a predetermined amount corresponding to the number of channel increments from the primary channel.

13. A method of providing channel maps of available spectrum to radio devices, comprising:
   receiving a request for a channel map from one of the radio devices;
   determine channels that are available to the requesting radio device for wireless communications;
   determining, for each channel determined to be available, a predicted noise floor amount caused by high-power protected transmitters that are known to the system prior to receipt of the request, wherein the determination of predicted noise floor is made using a path loss model for a location of the requesting radio device, and wherein, for each predicted noise floor, interference from primary channel and out-of-band emissions of the transmitters is considered; and
   transmitting a channel map of the available channels to the requesting radio device, the channel map indicating relative predicted noise floor amount among the available channels.

14. The method of claim 13, wherein the request is a whitespace channel map request.

15. The method of claim 13, wherein the available channels in the channel map are ranked in order of noise floor from least to most to indicate the relative noise floor amount among the available channels.

16. The method of claim 13, wherein the channel map includes the determined noise floor amount for each available channel.

17. The method of claim 13, wherein transmitters considered during the determining of the predicted noise floor amounts are transmitters that are within a predetermined distance from the requesting radio device.

18. The method of claim 13, wherein transmitters considered during the determining of the predicted noise floor amounts are transmitters that have a field strength at the transmitter's primary channel that is above a predetermined threshold.

19. The method of claim 13, wherein transmitters considered during the determining of the predicted noise floor amounts are transmitters that have either one of a primary channel matching one of an available channel for the requesting radio device or a channel adjacent an available channel for the requesting radio device by a predetermined number of channel increments above or below the available channel.

20. The method of claim 13, wherein the predicted interference is determined by:
   for each transmitter considered, identify an interference contribution for the transmitter on the transmitter's primary channel and out-of-band emissions for adjacent channels that are a predetermined number of channel increments above or below the primary channel; and
   for each available channel, sum the corresponding interference contributions from each transmitter.

21. The method of claim 20, for each channel for which sensed interference data is available, further including the sensed interference data in the sum of the interference contributions from each transmitter.

22. The method of claim 20, wherein the predicted noise floor for each available channel is adjusted for antenna characteristics of the requesting radio device.

23. The method of claim 20, wherein the interference contribution for the transmitter's primary channel is determined using a path loss model and the distance between the transmitter and the requesting radio device.

24. The method of claim 23, wherein the interference contribution for the channels adjacent the transmitter's primary channel is determined by reducing the interference contribution for the transmitter's primary channel by a predetermined amount corresponding to the number of channel increments from the primary channel.

\* \* \* \* \*